United States Patent
Schroeder

(10) Patent No.: US 7,613,362 B1
(45) Date of Patent: Nov. 3, 2009

(54) IMAGE WARP

(75) Inventor: Stephen Ronald Schroeder, Fort Collins, CO (US)

(73) Assignee: Orbimage SI Opco, Inc., Dulles, VA (US)

( * ) Notice: Subject to any disclaimer, the term of this patent is extended or adjusted under 35 U.S.C. 154(b) by 0 days.

(21) Appl. No.: 11/835,169

(22) Filed: Aug. 7, 2007

Related U.S. Application Data

(63) Continuation of application No. 10/684,295, filed on Oct. 10, 2003, now Pat. No. 7,269,299.

(51) Int. Cl.
*G06K 9/32* (2006.01)
(52) U.S. Cl. .................. 382/294; 382/276; 382/293; 382/284
(58) Field of Classification Search ......... 382/293–295, 382/284
See application file for complete search history.

(56) References Cited

U.S. PATENT DOCUMENTS

| 5,343,410 | A |   | 8/1994  | Tsujiuchi et al. |         |
|-----------|---|---|---------|------------------|---------|
| 5,577,181 | A | * | 11/1996 | Givens et al.    | 382/294 |
| 5,949,914 | A |   | 9/1999  | Yuen             |         |
| 5,987,164 | A |   | 11/1999 | Szeliski et al.  |         |
| 5,991,461 | A |   | 11/1999 | Schmucker et al. |         |
| 6,097,854 | A |   | 8/2000  | Szeliski et al.  |         |
| 6,222,938 | B1|   | 4/2001  | Melen            |         |
| 6,408,085 | B1|   | 6/2002  | Yuen             |         |
| 6,694,064 | B1| * | 2/2004  | Benkelman        | 382/284 |

OTHER PUBLICATIONS

"Image Warping with Scattered Data Interpolation" Ruprecht, D.; Muller, H.; Computer Graphics and Applications, IEEEvol. 15, Issue 2, Mar. 1995 pp. 37-43.*
Ruprecht, D, Muller, H., "Image Warping with Scattered Data Interpolation," Computer Graphics and Applicatins, IEEE, vol. 15, Issue 2, Mar. 1995I; pp. 37-43.

* cited by examiner

*Primary Examiner*—Bhavesh M Mehta
*Assistant Examiner*—Sean Motsinger
(74) *Attorney, Agent, or Firm*—Fennmore Craig, P.C.

(57) ABSTRACT

Method for warping first and second overlapping images includes selecting a first set of points in a first image, the first set of points being located in an overlap region between first and second images; selecting a set of tie points in the second image, including individual tie points each of which correlates to a point in the first set of points; selecting from the first image a patch including at least one point from the first set of points and at least one neighboring point; performing shadow detection to determine a percentage of the patch exceeding a predetermined percentage, thereby indicating a shadow; if so, eliminating the at least one point so that it is not correlated with any of the individual tie points, thereby avoiding correlating the shadow in the first image to a shadow in the second image.

9 Claims, 10 Drawing Sheets

IMAGE WARP

CROSS-REFERENCE TO RELATED APPLICATION

The present application is a continuation of U.S. patent application Ser. No. 10/684,295, filed Oct. 10, 2003, now U.S. Pat. No. 7,269,299, which is incorporated herein by reference for all that it discloses.

BACKGROUND OF THE INVENTION

Images, such as satellite images, can be combined to produce one large panorama or mosaic of images. One problem encountered in combining images is that there may be misregistration between the images. The misregistration may be caused by a variety of factors. With respect to satellite images, for example, misregistration may be caused by errors in the digital elevation model used in the orthorectification process for elevation correction of points in the image. The misregistration may cause shear or feature misalignment along a seam between a pair of images.

One approach that has been used to correct for the misregistration is to correlate a pair of images along a line halfway between an overlap region of the images. The shift determined by the correlation is then applied half to one image and half to the second image. This approach assumes that the image overlaps are horizontal or vertical rectangles and that the seam is placed in the middle of the overlap region. However, the overlap regions are often not horizontal or vertical rectangles and the seams are often not positioned down the middle of the overlap region. Additionally, if the misregistration between the images is not consistent, this approach only corrects for a small amount of misregistration and will not work properly for large misregistration between the images.

SUMMARY OF THE INVENTION

Methods and computer readable media for performing those methods are disclosed for warping overlapping images. A method for transforming a set of overlapping images, comprises selecting a first set of points in a first image, the first set of points being located in an overlap region between the first image and a second image; selecting a set of tie points in the second image, the set of tie points comprising individual tie points, each individual tie point correlating to a point in the first set of points; selecting a patch in the first image, the patch comprising patch points including at least one point from the first set of points and at least one neighboring point within a first distance from the at least one point; performing shadow detection to determine a percentage of the patch comprising a shadow; determining if the percentage of the patch comprising the shadow exceeds a predetermined percentage; if the percentage exceeds the predetermined percentage, eliminating the at least one point from the first set of points so that the at least one point is not correlated with any of the individual tie points, thereby avoiding correlating the shadow in the first image to a shadow in the second image.

Another embodiment of a method for transforming a set of overlapping images, comprises selecting a first set of points in a first image, the first set of points comprising at least one pixel and being located in an overlap region between the first image and a second image; selecting at least one set of tie points in the second image, the at least one set of tie points comprising an individual tie point, the individual tie point correlating to the pixel; selecting a patch in the first image, the patch comprising the at least one pixel and at least one neighboring pixel within a first distance from the at least one pixel; identifying at least one set of potential tie points, the at least one set of potential tie points comprising a first potential tie point and at least one neighboring potential tie point within a second distance from the first potential tie point; correlating one of the at least one pixel and the at least one neighboring pixel from the patch with the first potential tie point and the at least one neighboring potential tie point to obtain a plurality of correlation values; evaluating the plurality of correlation values to determine a best correlation, the best correlation being associated with a best correlation tie point and a best correlation potential tie point, the best correlation tie point being in the at least one set of tie points and the best correlation potential tie point being in the at least one set of potential tie points; and automatically using the best correlation to warp the first image and the second image by tying the pixel or the neighboring pixel to the best correlation tie point and the best correlation potential tie point.

BRIEF DESCRIPTION OF THE DRAWINGS

Illustrative embodiments of the invention are illustrated in the drawings in which.

DETAILED DESCRIPTION

Figure 1A:
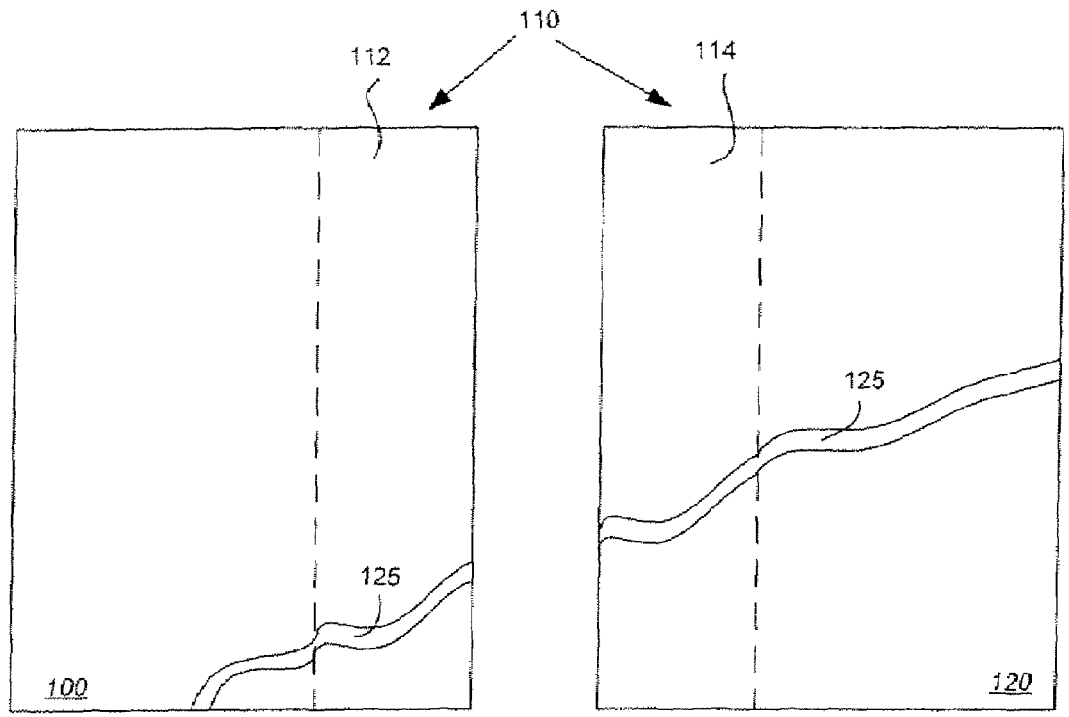
FIG. 1A illustrates a pair of overlapping images that may be combined into an image mosaic.
Figure 1B:
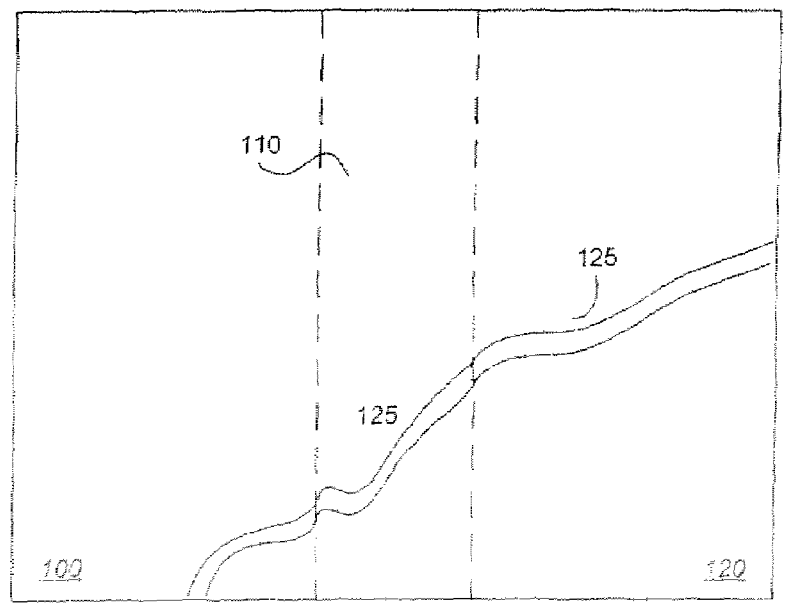
FIG. 1B illustrates an image mosaic constructed from the pair of images in FIG. 1A.

As shown in FIGS. 1A and 1B, an image mosaic may be produced from a pair of overlapping images 100, 120. By way of example, images 100, 120 may be images taken from a satellite. The image mosaic includes an overlap region 110 where image 100 overlaps with image 120. The images may contain one or more features, such as feature 125, which may not align correctly when the images are combined because of misregistration of the images. As shown in FIG. 1A, region 112 of image 100 that corresponds to overlap region 110 is not properly registered to region 114 of image 120 that corresponds to overlap region 110. If the images were combined without correcting for the misregistration, feature 125 would not be aligned properly along the seam between the images. A method, such as that described in FIG. 2, may be used to correct for the misregistration so that the images are properly aligned as shown in FIG. 1B. It should be appreciated that other image mosaics may contain additional features and may be a combination of a different number of images than that shown in FIGS. 1A and 1B. It should also be appreciated that overlap region 110 may have a different shape than that shown.

Alignment of Images

Figure 2:
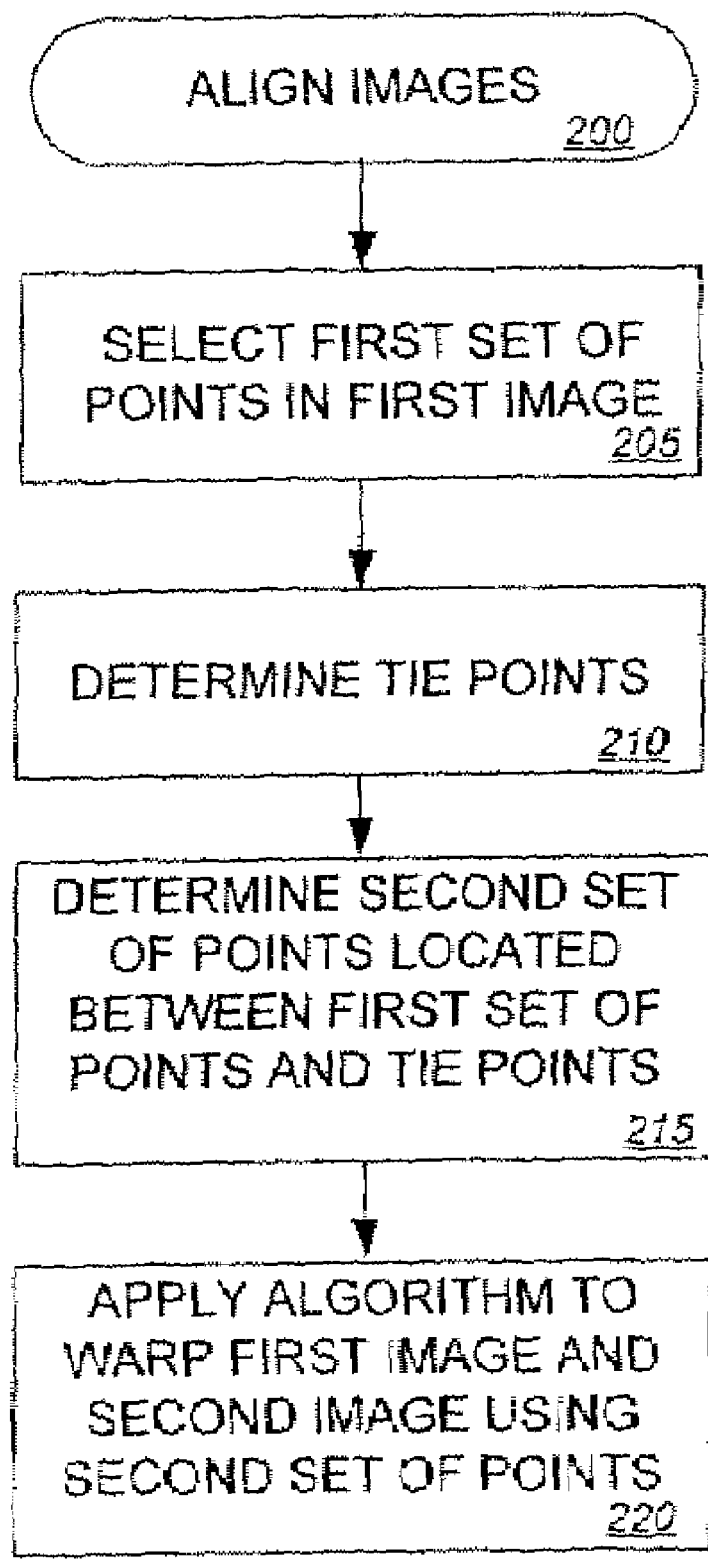
FIG. 2 is a flow diagram illustrating an exemplary method that may be used to align the images of FIG. 1A.

FIG. 2 illustrates a method 200 that may be used to align images 100, 120. First, a first set of points located in the overlap region 112 of the first image 100 are selected 205. By way of example, the first set of points may be selected using a grid of blocks of a predetermined size (e.g., 32 points by 32 points), so that a point is selected from each block of the grid. Other methods may also be used to select the first set of points.

One or more tie points located in the overlap region 114 of the second image 120 are then determined 210. Each tie point correlates to a point in the first set. Because of misregistration between the images, the tie point may not be in the same position in the overlap region 110 as the point from the first set to which it is correlated. Additionally, the displacement between a tie point and its correlated point from the first set may vary from other tie points and their correlated points. It should be appreciated that by correlating points from the first image 100 located throughout overlap region 110 to tie points in the second image 120, the correction of misregistration of the images is not limited to a seam in the middle of the overlap region 110 and the overlap region may be irregularly shaped.

Next, a second set of points are determined 215 so that each point in the second set is located at a position in the overlap region 110 between a point in the first set and its correlated tie point. By way of example, the second set of points may each be located halfway between a point in the first set and its correlated tie point. As will be described below, the second set of points will be used to warp the first image 100 and the second image 120. By using points located between the correlated points of the images 100, 120, a fixed percentage of the warp will be applied to each image. For instance, if the second set of points are located halfway between the correlated points, the warps will be applied 50% to each image.

An algorithm that uses the second set of points is then applied 220 to warp the first image and the second image. The algorithm repositions at least a portion of the points in the first image 100 and at least a portion of the points in the second image 120 so that the images are aligned. By way of example, the portion of points from the first image 100 may include points in the overlap region 110 and points located a predetermined distance from the overlap region 110. The algorithm may use the known displacements between the points in the second set and their correlating points from the first set to warp the portion of points in the first image 100. Similarly, the known displacements between the points in the second set and their correlating tie points may be used to warp the portion of points in the second image 120. The displacements at the correlated points may be used to calculate an interpolation for other points in the images to be warped. In other embodiments, the warp may be applied entirely to one image and points may only be repositioned in that image.

Figure 3:
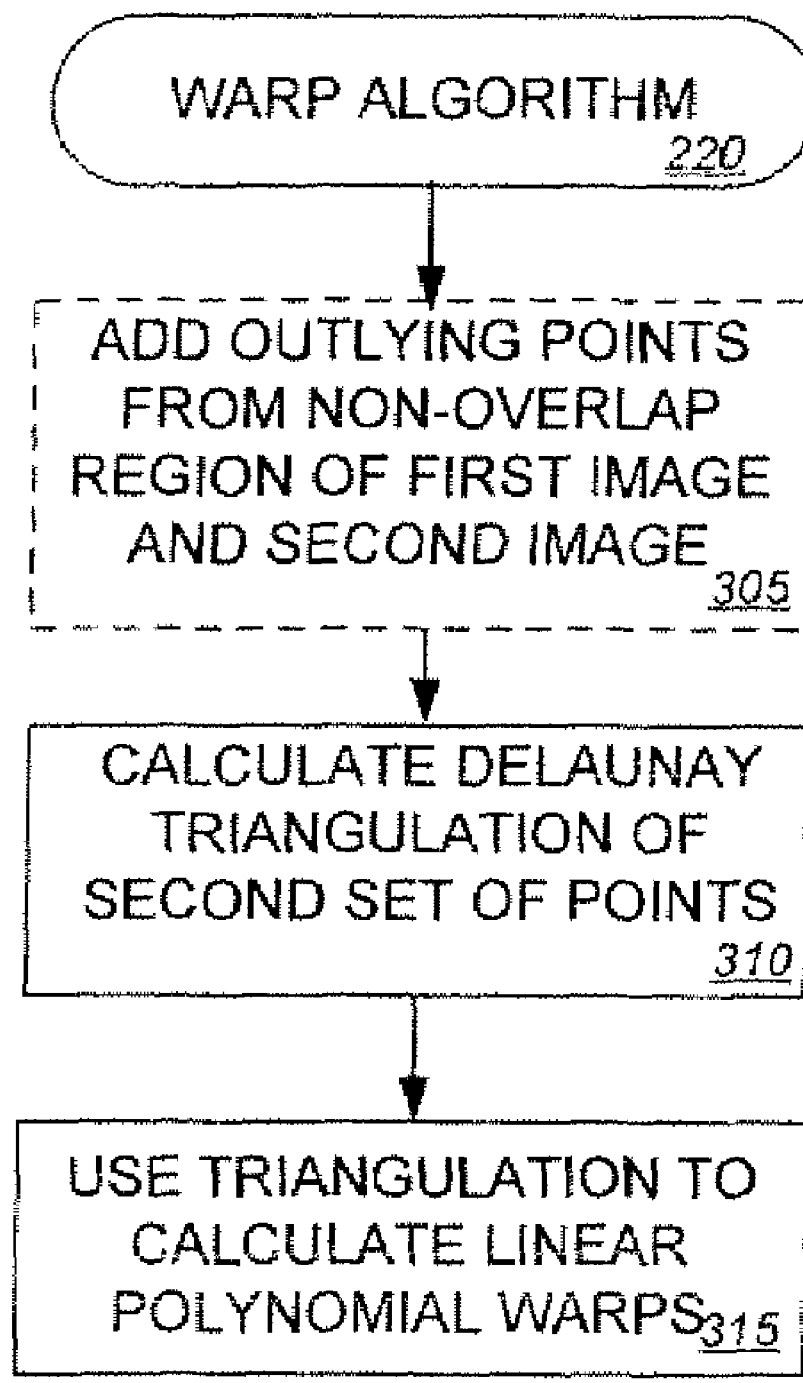
FIG. 3 is a flow diagram illustrating an exemplary warp algorithm that may be used in the method of FIG. 2.

FIG. 3 illustrates an exemplary warp algorithm that may be used by the method of FIG. 2. Optionally, outlying points from the first image 100 located in the non-overlap region of image 100 and/or outlying points from the second image 120 located in the non-overlap region of image 120 may be added 305 to the second set of points used to warp the images. The outlying points may each be located within a predetermined distance from the overlap region 110. As the outlying points do not have physical points in the alternate image to which they correlate, the displacement used in the warp algorithm may be set to a predetermined displacement (e.g., 0). It should be appreciated that by adding outlying points, the warps may be feathered out from the overlap region so that repositioning of points in the overlap region 110 does not cause each image to be misaligned at its overlap seam.

Figure 4:
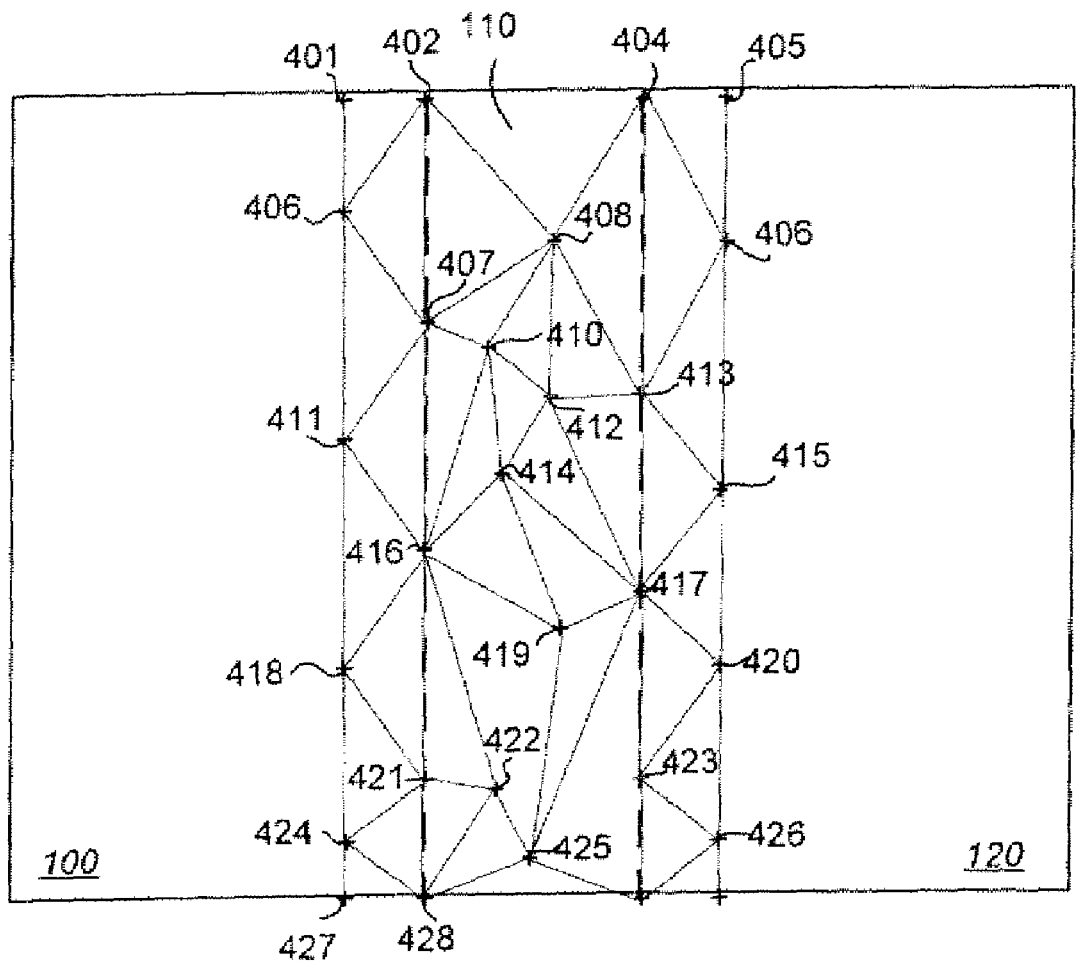
FIG. 4 illustrates a triangulation of the overlap region of FIG. 1A that may be produced by the method of FIG. 3.

Next or, to begin, if optional points have not been added 305, a Delaunay triangulation is calculated 310 for points in the second set. An exemplary Delaunay triangulation is shown in FIG. 4. The triangulation may be used to interpolate the displacement of points located between the points in the second set with known displacements to points in the first set and tie points.

Linear polynomial warps may then be calculated 315 for the images 100, 120 using the Delaunay triangulation. The warp may be created using a linear least squares approach which results in a linear polynomial. A system that may be used to calculate the polynomial for the first image 100 is shown in Equation (1).

$$\begin{bmatrix} \Sigma s_i^2 & \Sigma s_i l_i & \Sigma s_i & 0 & 0 & 0 \\ \Sigma s_i l_i & \Sigma l_i^2 & \Sigma l_i & 0 & 0 & 0 \\ \Sigma s_i & \Sigma l_i & \Sigma 1 & 0 & 0 & 0 \\ 0 & 0 & 0 & \Sigma s_i^2 & \Sigma s_i l_i & \Sigma s_i \\ 0 & 0 & 0 & \Sigma s_i l_i & \Sigma l_i^2 & \Sigma l_i \\ 0 & 0 & 0 & \Sigma s_i & \Sigma l_i & \Sigma 1 \end{bmatrix} * \begin{bmatrix} u_0 \\ u_1 \\ u_2 \\ u_3 \\ u_4 \\ u_5 \end{bmatrix} = \begin{bmatrix} \Sigma s_i x_i \\ \Sigma l_i x_i \\ \Sigma x_i \\ \Sigma s_i y_i \\ \Sigma l_i y_i \\ \Sigma y_i \end{bmatrix} \quad (1)$$

where $x_i$ is the x coordinate of the point in the first set of points from the first image correlated to a vertex$_i$ of a triangle, $y_i$ is the y coordinate of the point from the first set of points correlated to the vertex$_i$, $s_i$ is the x coordinate of the vertex of the triangle, $l_i$ is the y coordinate of the vertex of the triangle, and $u_i$ are the coefficients used to compute the locations in the first image that correlate to locations in the overlap region 110.

The system can then be used to reposition the points in the first image located at the overlap region and within the predetermined distance from the overlap region. Thus, for any output location s, l for the warped first image 100, the original location x, y of the point is:

$$x = s * u_0 + l * u_1 + u_2 \quad (2)$$

$$y = s * u_3 + l * u_4 + u_5 \quad (3)$$

The point x,y is moved to output location s, l. The same system can be used to warp the second image, with $x_i$ being the x coordinate of the tie point from the second image correlated to a vertex$_i$ of a triangle and $y_i$ being the y coordinate of the tie point. Thus, the known displacements between the points in the first set and the second set of points are used to warp the first image 100 and the known displacements between the tie points and the second set of points are used to warp the second image 120. In some embodiments, if the output location has an originating point outside the boundaries of the image, the intensity of the output location may be set to a default value (such as a background intensity). It should be appreciated that some points may be moved to more than one output location (e.g., because the warp stretches the image) and that some points may not be used in the warped image (e.g., because the warp compresses the image).

Determine Tie Points

Figure 5:
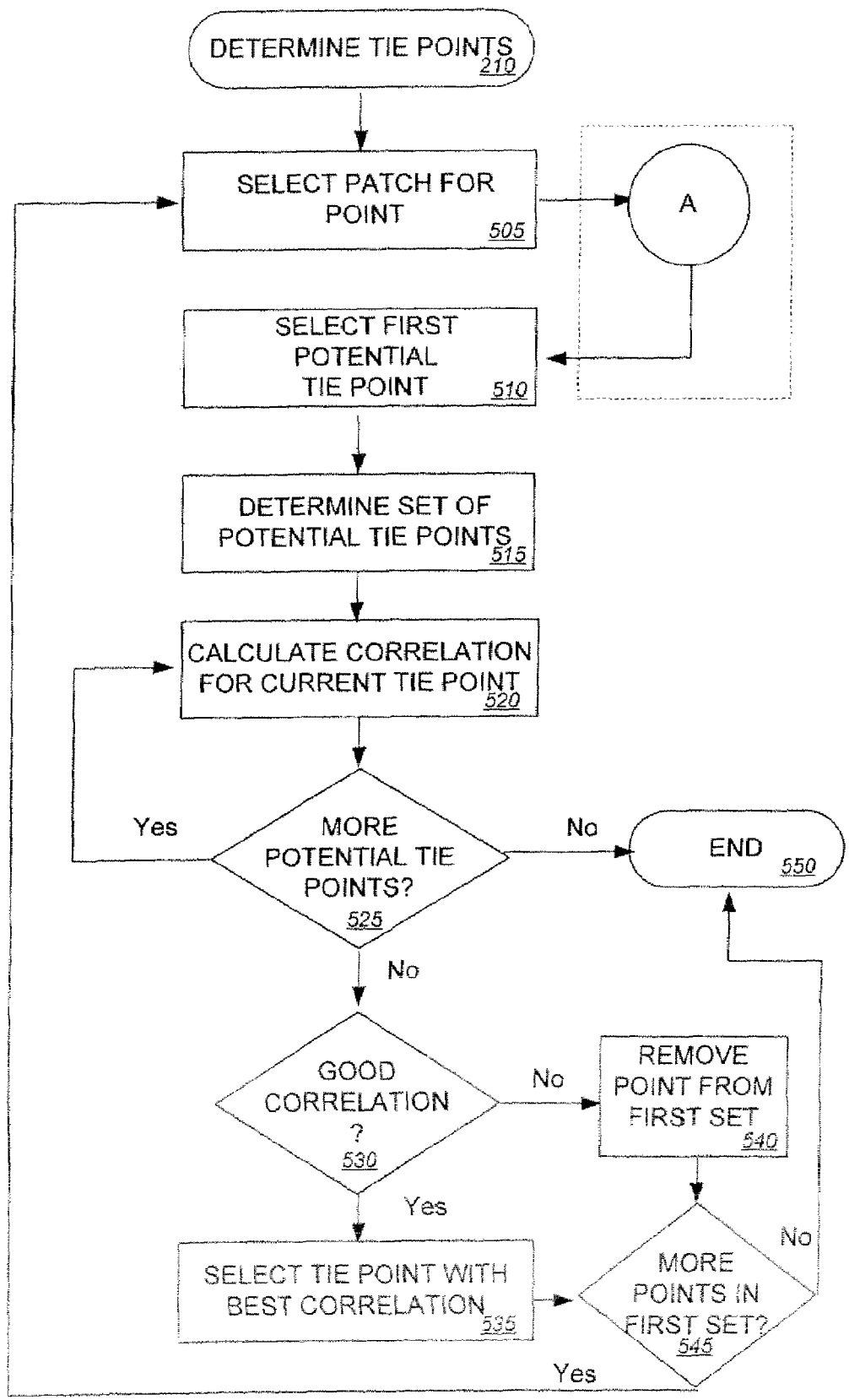
FIGS. 5 and 6 illustrate a flow diagram of an exemplary method for determining tie points that may be used by the method of FIG. 2.

FIG. 5 illustrates an exemplary method that may be used by the method of FIG. 2 to determine the tie points 210. For a point in the first set, a patch comprising the point and a set of neighboring points located within a first predetermined distance from the point is selected 505. By way of example, the first predetermined distance may be 2 points and all points in the first image 100 located within a radius of 2 points from the point in the first set may be selected for the patch. It should be appreciated that by selecting a patch of points 210, the points surrounding the point from the first set may be used to aid in the correlation of the point to a point in the second image 120.

Figure 6:
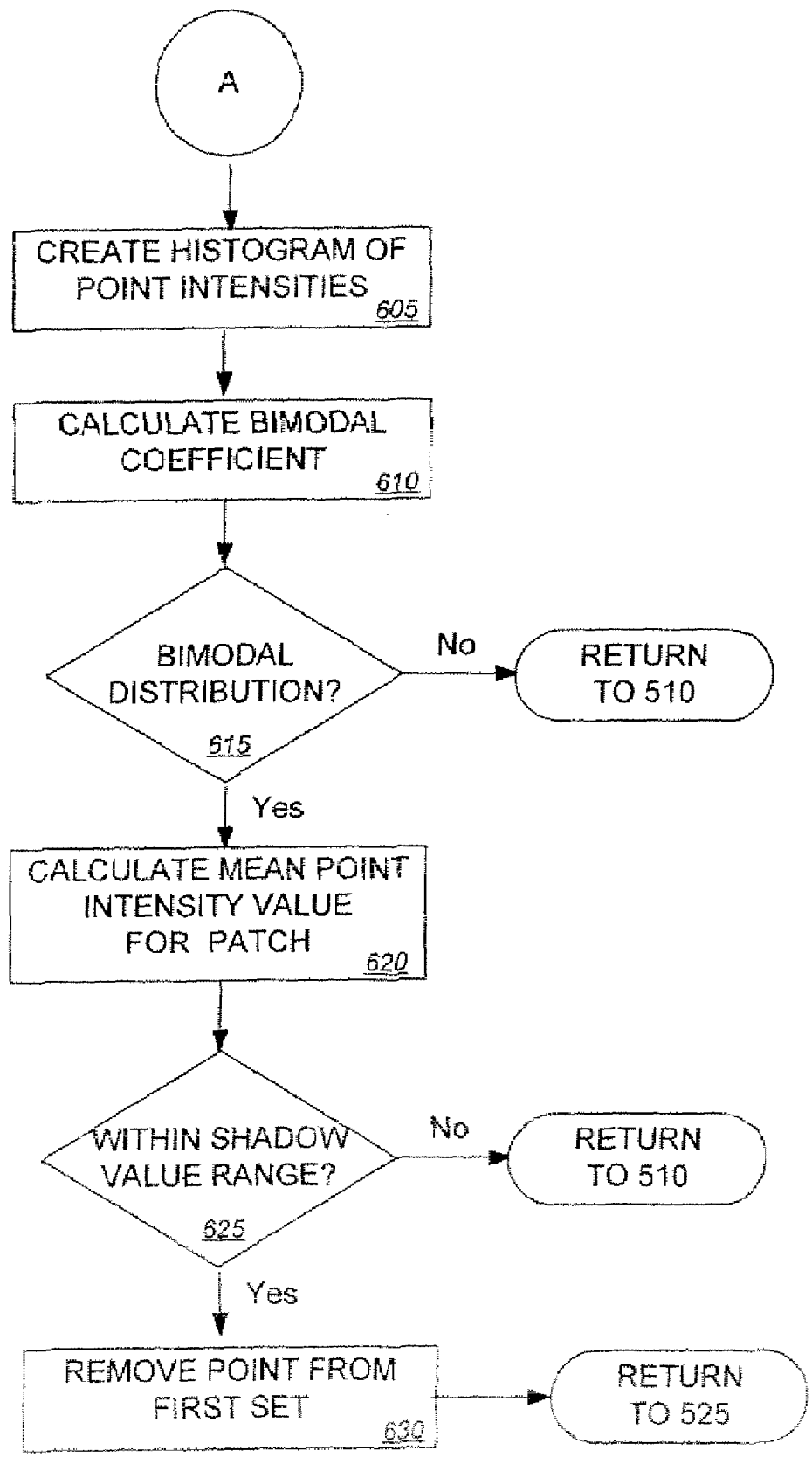

Optionally, before proceeding further, the point may be removed from the first set and may not be correlated to a tie point if a predetermined percentage (e.g., 50%) of the patch appears to be a shadow. This may provide for better correlation between the images 100, 120 by avoiding correlating shadows in one image 100 to a shadow in the second image 120. As shown in FIG. 6, shadow points may be detected by creating 605 a histogram of frequencies of point intensities in the patch is created. Next, a bimodal coefficient for the histogram is calculated 610. By way of example, the bimodal coefficient b may be calculated as shown in Equation (4):

$$b=[(m_3^2+1)/(m_4^2+[(3(n-1)^2)/(n-2)(n-3))])] \quad (4)$$

where $m_3$=skew, $m_4$=kurtosis, and n is the number of pixels in the patch.

If the bimodal coefficient does not indicate 615 a bimodal distribution, the method continues with block 510. If the bimodal coefficient indicates a bimodal distribution 615 (e.g., coefficient is greater than 0.555), a mean point intensity value is calculated 620 for the patch. The mean intensity value is then examined to determine if it falls within a predefined shadow range 625 (e.g., a range slightly above and below a shadow intensity value). This may prevent patches that are made up of normal light and dark elements from being discarded.

If the mean does not fall within the predetermined shadow range, the method continues with block 510. Otherwise, the point in the first set is probably a shadow and is removed from the first set 630 and a tie point from the second image is not correlated to this point. The method then continues at block 525 where a determination is made as to whether there are more points in the first set to process. In alternate embodiments, other methods may be used to detect shadows in image 100 and shadow detection may be performed at a different point of the method used to determine tie points 210 or may not be performed at all.

Returning to FIG. 5, after the patch is selected 505 and optionally after shadow detection has been performed, a first potential tie point in the second image 120 is selected 510. By way of example, the first potential tie point may correspond to the same location in the overlap region 110 as the point in the first set. Next, a set of potential tie points including the first potential tie point and one or more additional potential tie points located within a second predetermined distance surrounding the first potential tie point is determined 515. The second predetermined distance may be set to a maximum number of points the images are expected to be misregistered by. All points within the range of the second predetermined distance may be points that could potentially correlate to the point from the first set.

For a potential tie point, a correlation is calculated 520 between points in the first patch and the tie point and neighboring points in the second image located within the first predetermined distance from the potential tie point. If there are more potential tie points 525, the correlation is repeated using the new potential tie point and its neighboring points. Thus, a correlation value between the first patch and patches in the second image surrounding potential tie points is obtained for each potential tie point.

If a good correlation for the first patch exists 530, a tie point (a best correlation tie point) corresponding to the potential tie point with the best correlation is selected 535 to correlate to the point in the first set. If a good correlation does not exist 530, the point may be removed from the first set 540 and a correlating tie point is not found.

If there are more points 545 in the first set that need to be correlated to a tie point, processing continues by selecting a patch for the next point 505. Otherwise, the method ends 550.

Figure 7:
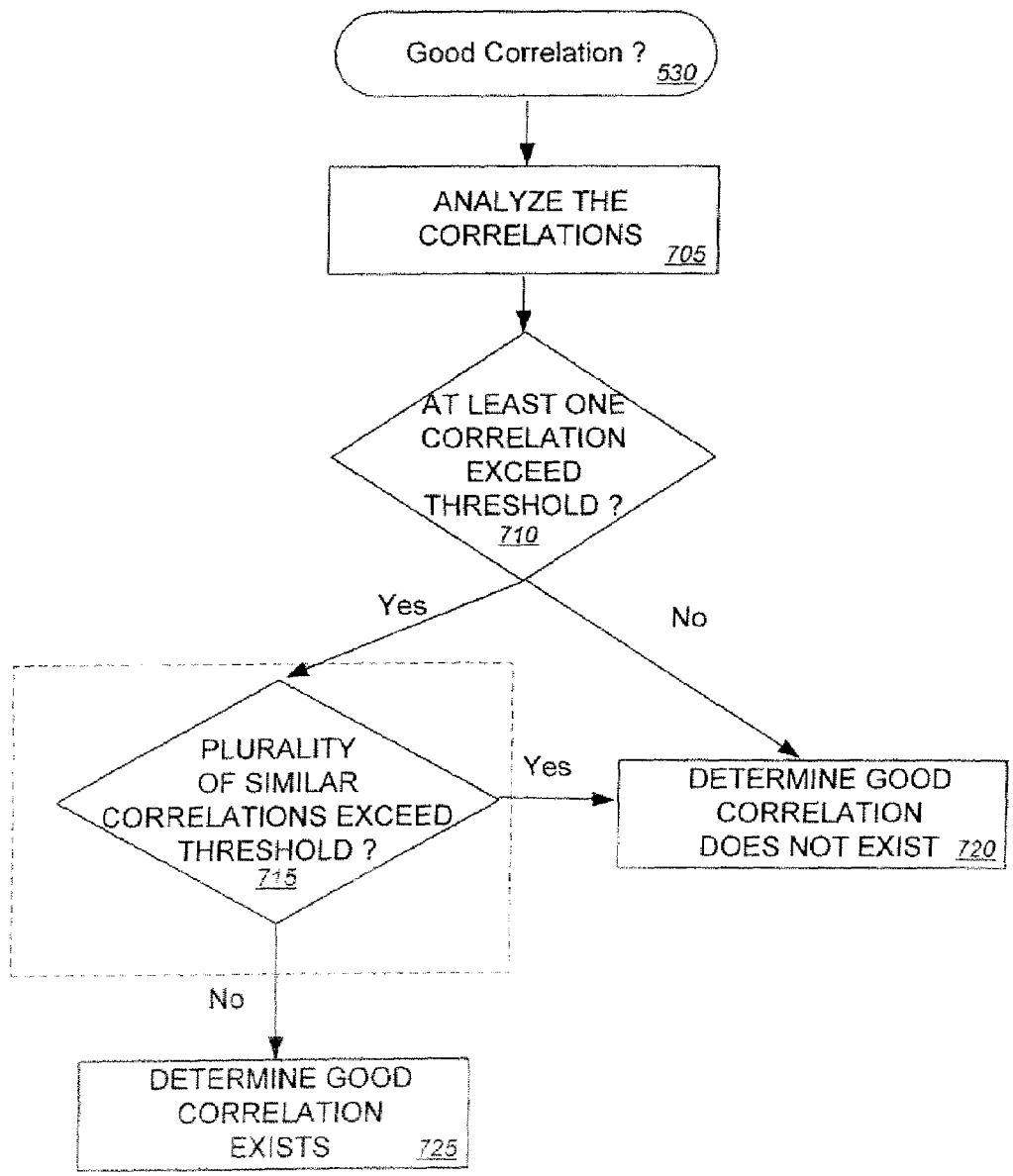
FIG. 7 is a flow diagram illustrating an exemplary method for determining if a good correlation exists that may be used by the method of FIGS. 5 and 6.

FIG. 7 illustrates an exemplary method that may be used by the method of FIG. 5 to determine if a good correlation between a point in the first set and a tie point exists 530. The correlations obtained for the potential tie points are analyzed 705. If there is not at least one correlation value for a potential tie point that exceeds a threshold 710 (e.g., 60%), a determination is made that a good correlation does not exist 720.

Optionally, if at least one correlation value exceeds the threshold, a check may be performed to determine if there are a plurality of similar correlations for a plurality of potential tie points that exceed the threshold 715. This may provide a better warping of the images as it may help prevent the use of bad correlations in the warp algorithm that result from constantly changing features (e.g., waves) or features that remain similar throughout the image (e.g., roads). If a plurality of similar correlations exceed the threshold, a determination is made that a good correlation does not exist 720. Otherwise, a determination is made that a good correlation exists 725. By way of example, a plurality of randomly distributed potential tie points with similar correlations exceeding the threshold may indicate the point is located within a wave or other constantly changing feature. Tie points with similar correlations that are positioned linearly to each other may indicate a feature, such as a road, that also may result in a bad correlation. It should be appreciated that other embodiments may include additional checks to determine if a good correlation between a point from the first set and a potential tie point exists.

Removing Tie Points

Figure 8:
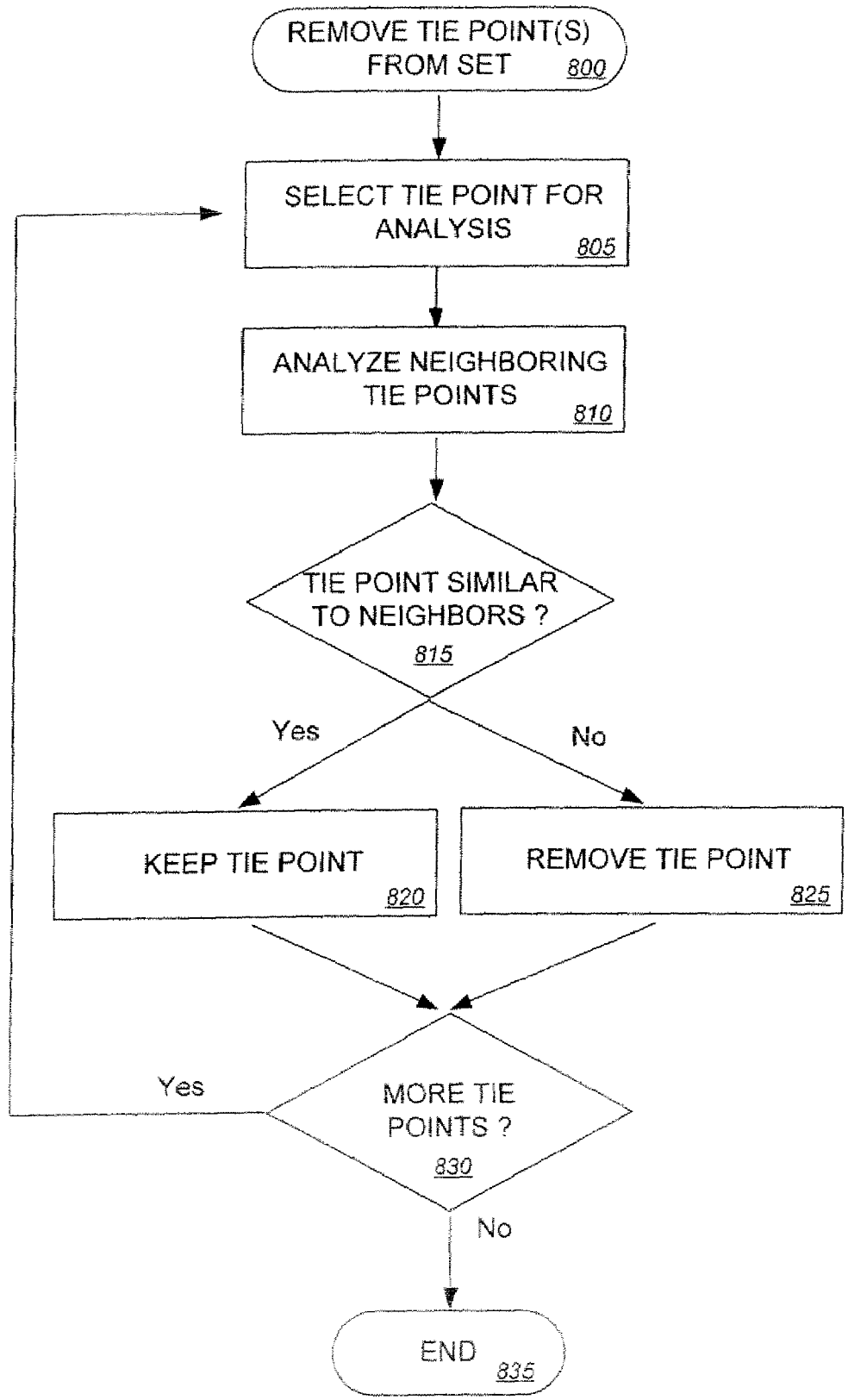
FIG. 8 is a flow diagram illustrating an exemplary method that may be used to remove tie points from the set of tie points.

In one embodiment, before the second set of points is determined 215, one or more tie points may be removed from the set of tie points. This may help prevent the use of bad correlations due to noise, shadows satellite angle, or other reason. FIG. 8 illustrates an exemplary method that may be used to remove tie points 800. It should be appreciated that in alternate embodiments, additional or different methods may be used to remove tie points that may have bad correlations.

The method begins with selecting a tie point for analysis 805. A plurality of tie points neighboring the selected tie point are then analyzed 810. If the results of the analysis indicate the tie point is not similar to the neighboring tie points 815, it is removed from the set of tie points 825.

In one embodiment, the neighboring tie points may be analyzed 810 by calculating an average (e.g., median) vertical displacement and an average horizontal displacement between the neighboring tie points and points in the first set correlated to the neighboring tie points. A determination may be made that the tie point is not similar to its neighbors 815, if the difference between the average horizontal displacement and the horizontal displacement between the tie point and the point in the first set to which it was correlated exceeds a predetermined threshold. Similarly, a determination may be made that the tie point is not similar to its neighbors 815, if the difference between the average vertical displacement and the vertical displacement between the tie point and its correlating point in the first set exceeds the predetermined threshold or a second predetermined threshold.

In another embodiment, the neighboring tie points may be analyzed 810 by calculating an average angular variance between the neighboring tie points and points in the first set correlated to the neighboring tie points. The magnitude of the displacement between the selected tie point and its correlating point from the first set may also be calculated since a large difference in angle may be less important if the magnitude of the displacement is small. Finally, the magnitude and average angular variance may be used to compare the selected tie point to its neighbors. Equation 5 illustrates an exemplary equation that may be used to compare the selected tie point to its neighboring tie points using the magnitude and average angular variance:

$$dA = sqrt((dx - mag * \cos \text{mean})^2 + (dy - mag * \sin \text{mean})^2) \quad (5)$$

where dx=horizontal displacement between the selected tie point and its correlating point from the first set, dy=vertical displacement between the selected tie point and its correlating point, mag=magnitude of the displacement, cos mean=average cosine variance of neighboring tie points, and sin mean=average sine variance of neighboring tie points. If dA is greater than a specified tolerance, a determination 815 is made that the tie point is not similar to its neighbors. It should be appreciated that in other embodiments, statistical techniques or equations different from the two embodiments described above may be used to compare the selected tie point to its neighboring tie points and determine if the points are similar.

If the tie point is similar to its neighbors 815, the tie point is kept 820. The method then continues by determining if there are more tie points that need to be analyzed 830. If there are additional tie points, processing returns to selecting the next tie point for analysis 805. Otherwise, the method ends 835.

Multi-Resolution Correlation

Figure 9:
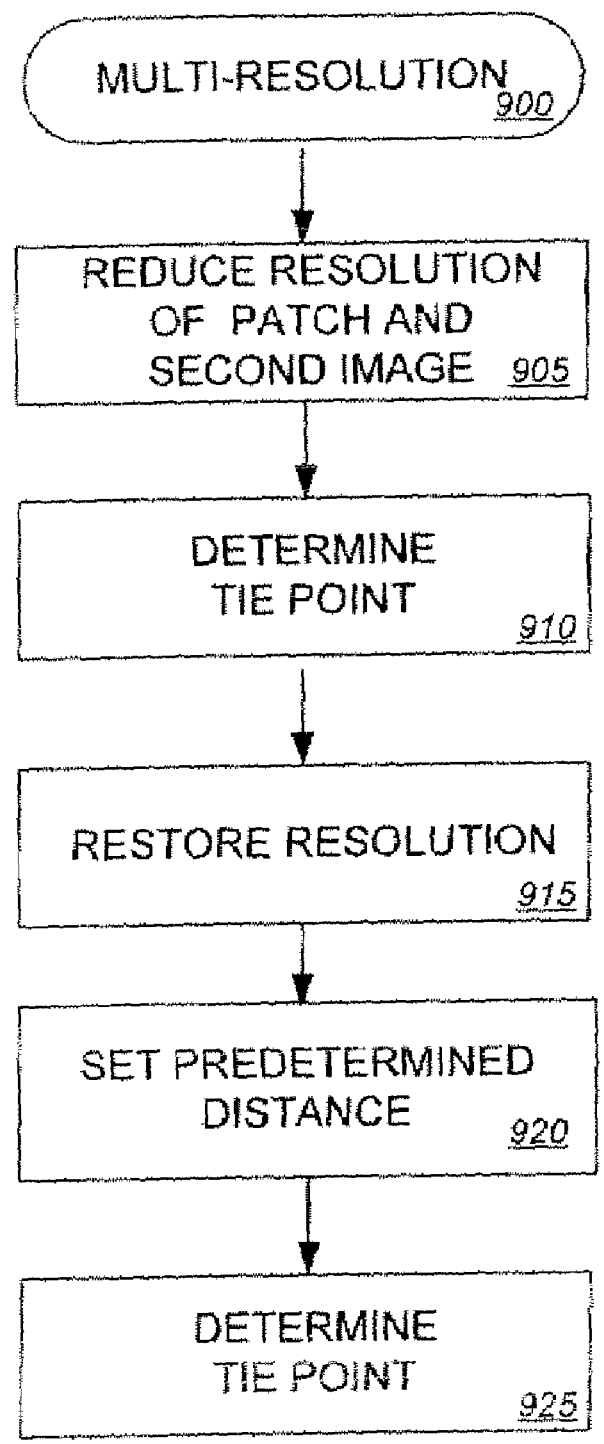
FIG. 9 is a flow diagram illustrating an exemplary method for multi-resolution correlation of images.

In some embodiments, a multi-resolution correlation process may be used to determine tie points 210. This may provide for a more efficient and faster correlation between points in the first set and tie points. FIG. 9 illustrates an exemplary method that uses multi-resolution correlation 900.

Before selecting the first potential tie point 510 for a point in the first set, the resolution of the patch is reduced by a resolution parameter 905. By way of example, the resolution may be reduced by averaging blocks of points or eliminating points. The resolution of at least a portion of the second image that the patch will be correlated over is also reduced by the resolution parameter. The reduced resolution patch is used to determine 910 a correlating tie point (if any) The correlating tie point may be determined by using a method such as that described in FIG. 5.

If a good correlation exists 530 and a tie point is selected 535, the resolution of the patch and the second image are restored to the original resolution 915. The tie point found in the previous iteration is selected as the first potential tie point 510. The maximum possible misregistration for this tie point is equal to two times the size of the resolution parameter. Thus, the second predetermined distance is set to this maximum possible misregistration 920.

A correlating tie point may then be determined 925 using the above-described parameters by repeating the determining the set of potential tie points 515, the calculating the correlation 520, and selecting the tie point with the best correlation 535. The reduced correlation method may be repeated for additional points in the first set. It should be appreciated that tie points may also be removed from the set of tie points as described in FIG. 7 before determining tie points with the full resolution. Thus, the number of correlations that are performed may be reduced because tie points with bad correlations are removed before the full resolution correlation is performed.

Coarse Mapping

Figure 10:
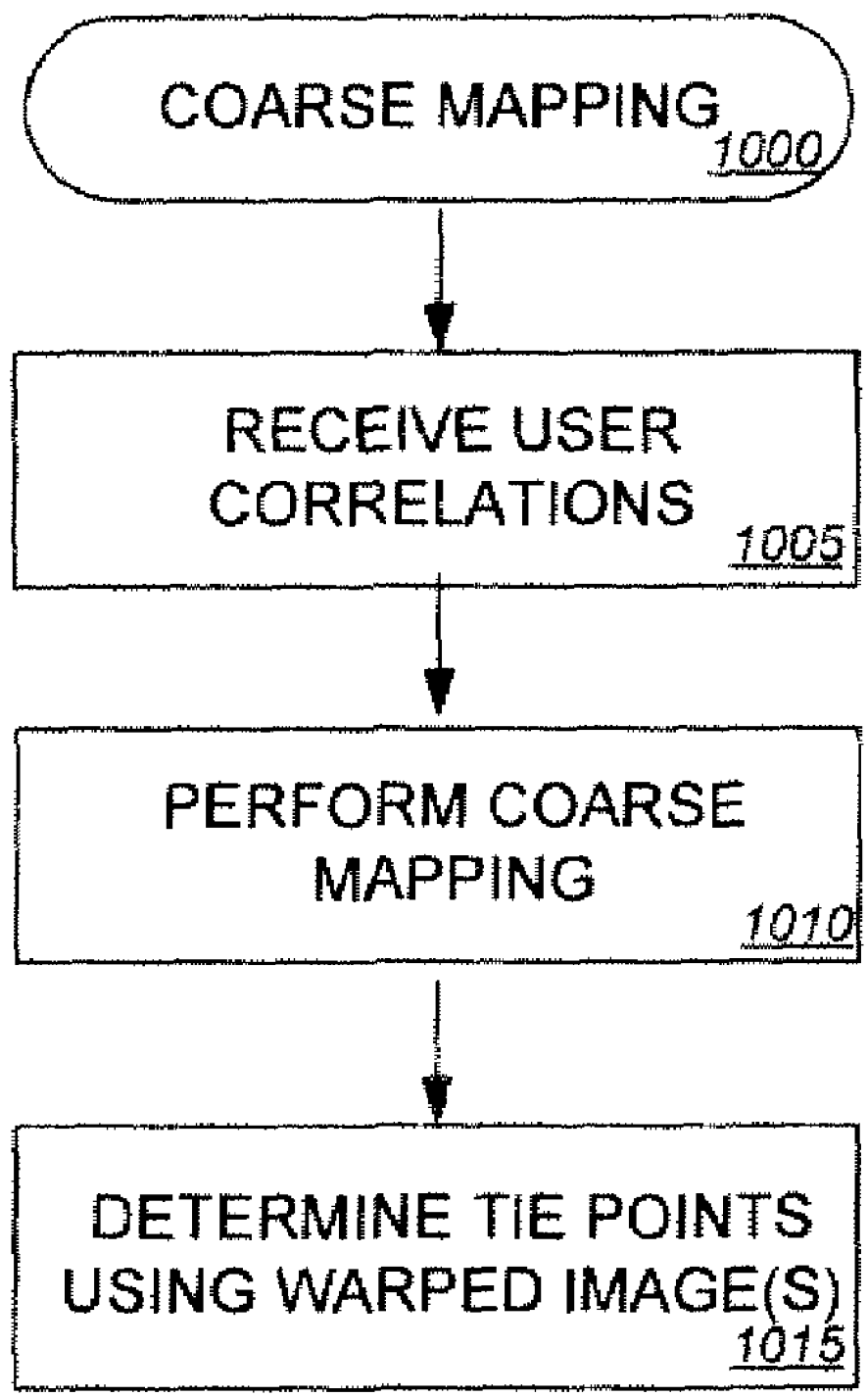
FIG. 10 is a flow diagram illustrating an exemplary method for coarse mapping of images that may be used prior to the method of FIG. 2.

FIG. 10 illustrates an exemplary method that may be used to perform a coarse mapping 1000 of the images 100, 120 before determining tie points 210. A set of user correlations is received 1005 from the user. The set of user correlations correlate a set of first points in the overlap region 112 of the first image 100 to initial tie points in the second image 120.

The set of user correlations are then used to perform 1010 a coarse mapping between points in the overlap region of the images. The coarse mapping may be computed by calculating a Delaunay triangulation of the initial tie points (or points located at a position between the first points provided by the user and the initial tie points) and using the triangulation to compute a linear coarse warp. One or both of the images are then warped in accordance with the linear coarse warp. In alternate embodiments, other techniques may also be used to perform 1010 a coarse mapping of the images. After the image or images are warped, a method similar to that described with reference to FIG. 5 may be used to determine tie points 1015. Thus, the user correlations may be used to improve the accuracy and/or speed of the final warping of the images.

In the foregoing description, for the purposes of illustration, methods were described in a particular order. It should be appreciated that in alternate embodiments, the methods may be performed in a different order than that described. Additionally, the methods described above embodied in machine-executable instructions stored on one or more machine-readable mediums, such as disk drives or CD-ROMs. The instructions may be used to cause the machine (e.g., computer processor) programmed with the instructions to perform the method. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for transforming image data representative of a set of overlapping images to produce an image mosaic, comprising:

selecting a first set of points in a first image, the first set of points being located in an overlap region between the first image and a second image;

selecting a set of tie points in the second image, the set of tie points comprising individual tie points, each individual tie point correlating to a point in the first set of points;

selecting a patch in the first image, the patch comprising patch points including at least one point from the first set of points and at least one neighboring point within a first distance from the at least one point;

performing shadow detection to determine a percentage of the patch comprising a shadow;

determining if the percentage of the patch comprising the shadow exceeds a predetermined percentage;

if the percentage exceeds the predetermined percentage, eliminating the at least one point from the first set of points so that the least one point is not correlated with any of the individual tie points, thereby avoiding correlating the shadow in the first image to a shadow in the second image; and warping the first and second images together to produce the image mosaic, said warping not utilizing any points eliminated from the first set of points.

2. The method of claim 1 wherein performing shadow detection comprises:

establishing a shadow range;

creating a histogram from image data of the patch;

determining, from the histogram, whether a bimodal distribution exists for the patch;

if the bimodal distribution exists, determining from the image data a mean point intensity for the patch;

determining whether the mean point intensity value falls within the shadow range;

using the mean intensity value to determine the percentage.

3. The method of claim 2 wherein determining whether a bimodal distribution exists comprises calculating a bimodal coefficient.

4. The method of claim 1, further comprising reducing the resolution of the patch by a resolution parameter.

5. The method of claim 4, further comprising reducing the resolution of the second image by the resolution parameter.

6. The method of claim 1, further comprising performing coarse mapping of the first image and the second image.

7. The method of claim 6 wherein performing coarse mapping comprises:

establishing a set of user correlations, the user correlations correlating the first set of points with the at least one set of tie points;

calculating a Delaunay triangulation of the at least one set of tie points; and using the Delaunay triangulation to create an initial warp of the first image and the second image.

8. The method of claim 7 wherein using the Delaunay triangulation comprises computing a linear coarse warp, the linear coarse warp being used to create an initial warp of the first image and the second image.

9. A computer readable medium readable by a computer, the medium embodying a program of instructions executable by the computer to cause the computer to transform image data representative of a set of overlapping images to produce an image mosaic by performing the actions of:

selecting a first set of points in a first image, the first set of points being located in an overlap region between the first image and a second image;

determining a set of tie points in the second image, the set of tie points comprising individual tie points, each individual tie point correlating to a point in the first set of points;

selecting a patch in the first image, the patch comprising patch points including at least one point from the first set of points and at least one neighboring point within a first distance from the at least one point;

performing shadow detection to determine a percentage of the patch comprising a shadow;

determining if the percentage of the patch comprising the shadow exceeds a predetermined percentage;

if the percentage exceeds the predetermined percentage, eliminating the at least one point from the first set of points, the at least one point being an eliminated point, so that the eliminated point is not correlated with any of the individual tie points, thereby avoiding correlating the shadow in the first image to a shadow in the second image; and warping the first and second images together to produce the image mosaic, said warping not utilizing any points eliminated from the first set of points.

* * * * *